United States Patent [19]

Tokutsu

[11] Patent Number: 4,978,116
[45] Date of Patent: Dec. 18, 1990

[54] SHEET FEEDING APPARATUS
[75] Inventor: Akihito Tokutsu, Yokohama, Japan
[73] Assignee: Kabushiki Kaisha Toshiba, Kawasaki, Japan
[21] Appl. No.: 317,978
[22] Filed: Mar. 2, 1989
[30] Foreign Application Priority Data
  Mar. 4, 1988 [JP] Japan .................. 63-50904
  Mar. 4, 1988 [JP] Japan .................. 63-50905
[51] Int. Cl.$^5$ ........................... B65H 29/16
[52] U.S. Cl. ................. 271/291; 271/186; 271/902
[58] Field of Search ........... 271/186, 291, 227, 246, 271/265, 266, 902; 355/318, 319, 320

[56] References Cited
U.S. PATENT DOCUMENTS

| | | | |
|---|---|---|---|
| 4,610,446 | 9/1986 | Ide ........................ | 271/291 |
| 4,692,020 | 9/1987 | Tsujihara ................ | 271/291 X |
| 4,708,789 | 3/1978 | Kittredge ............... | 271/186 X |
| 4,735,409 | 4/1988 | Brown .................... | 271/186 |
| 4,744,553 | 5/1988 | Hirose .................... | 271/186 X |
| 4,815,722 | 3/1989 | Sugimoto ................ | 271/291 X |

FOREIGN PATENT DOCUMENTS 60-36258  2/1985  Japan .

Primary Examiner—Richard A. Schacher
Attorney, Agent, or Firm—Foley & Lardner, Schwartz, Jeffery, Schwaab, Mack, Blumenthal & Evans

[57] ABSTRACT

An automatic original feeding apparatus comprises a feeding unit for feeding an original to an original table, and a main unit for setting the original in a predetermined position on the original table and discharging the original from the table. The main unit includes first and second conveyor belts disposed along the direction of sheet transportation and capable of transporting the sheet independently and reversely. A turning mechanism for turning over the sheet is disposed between the first and second conveyor belts.

9 Claims, 12 Drawing Sheets

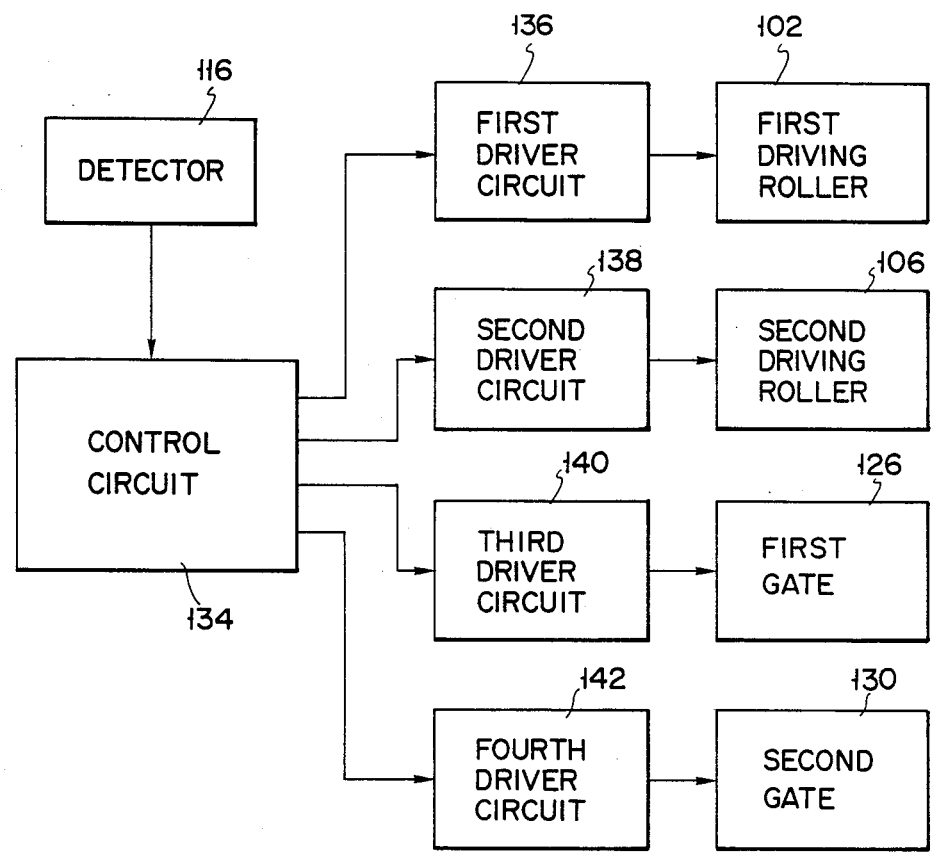
F I G. 3

SHEET FEEDING APPARATUS

BACKGROUND OF THE INVENTION

1. Field of the Invention

The present invention relates to sheet feeding apparatuses, such as automatic original feeding apparatuses, for feeding an original to an original table of, for example, an electronic copying machine.

2. Description of the Related Art

Some of the automatic original feeding apparatuses of this type have a function to turn over the original. These apparatuses comprise an original table for carrying the original. After the original is taken out by means of a pickup roller, it is separated from its successors by means of a pair of separating rollers. Then, the original is delivered to aligning rollers by means of feed rollers. After it is aligned by the aligning rollers, the original is fed to a conveyor belt. Thereupon, it is transported to a predetermined position on the original table to be set therein. In this state, one side of the original is copied. Subsequently, the original is removed from the original table by means of the conveyor belt, and is then discharged onto a receiving tray by means of feed rollers, exit guides, and exit rollers. In copying both sides of the original, the conveyor belt is rotated reversely after the end of the copying of the one side. As a result, the original is returned to the aligning rollers. A gate is provided between the original table and the aligning rollers. The original is guided to a turning mechanism by means of the gate. The turning mechanism includes a looped turn guide, used to guide the original from the gate to the upper-course side of the aligning rollers, and a plurality of guide rollers arranged along the turn guide. As the guide rollers rotate, the original is transported along the turn guide, whereby it is turned over and delivered to the aligning rollers. After it is aligned by means of the aligning rollers, the original is delivered to the conveyor belt. By the conveyor belt, the original is transported again to the original table to be set thereon. In this state, the other side of the original is copied. After the copying of both sides of the original is finished, the original is transported successively through the conveyor belt, feed rollers, and exit rollers, to be discharged onto the tray.

Since the turning mechanism is located on the supply side of the conveyor belt, the original must be transported for a long distance by the belt in order to be turned over. Thus, the time required for turning over the original is so long that the turning mechanism of this arrangement cannot be applied to high-speed machines.

SUMMARY OF THE INVENTION

The object of the present invention is to provide an apparatus capable of feeding a sheet to a feedable section in a manner such that the sheet is turned over as it is transported for only a short distance.

According to an aspect of the present invention, there is provided a sheet feeding apparatus which comprises feeding means for feeding a sheet toward a feedable section, transportation means for setting the sheet in a predetermined position at the feedable section and discharging the sheet from the feedable section, said transportation means including first and second transportation sections disposed along the direction of sheet transportation and capable of transporting the sheet independently, and turning means for turning over the sheet transported by one of said first and second transportation sections.

BRIEF DESCRIPTION OF THE DRAWINGS

FIG. 3 is an electric circuit diagram of the original feeding apparatus shown in FIG. 2;

DETAILED DESCRIPTION OF THE PREFERRED EMBODIMENT

Figure 1:
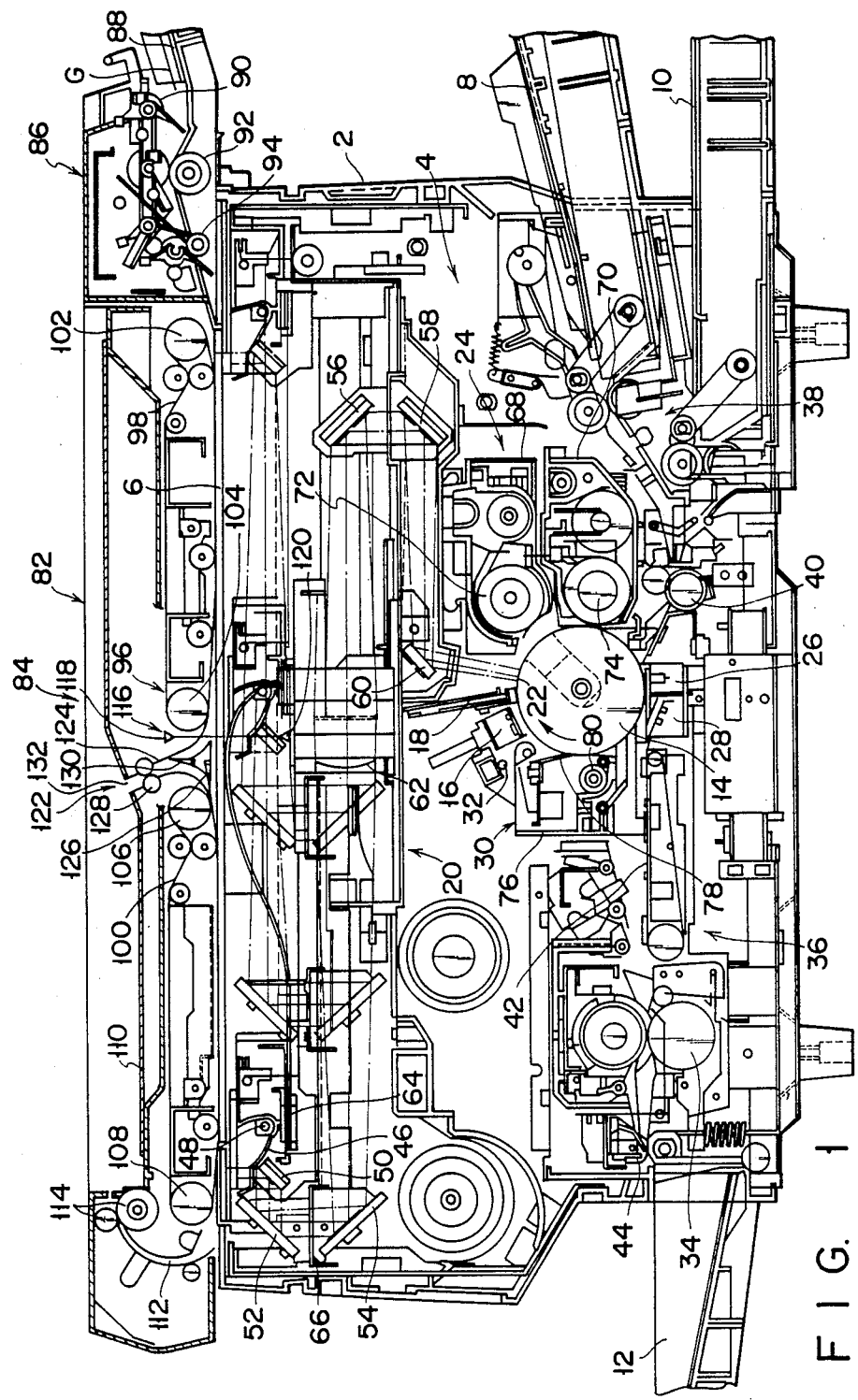
FIG. 1 is a sectional view showing the internal construction of an image forming apparatus using an automatic original feeding apparatus, as a sheet feeding apparatus according to the present invention.

In FIG. 1, numeral 2 denotes a housing of an image forming apparatus, e.g., an electronic copying machine. Housing 2 contains image forming unit 4 which is used to execute various image forming processes, including electrification, exposure, development, cleaning, fixing, etc. Original table 6 for carrying an original is disposed on the top of housing 2.

Upper and lower sheet cassettes 8 and 10, which contain paper sheets, e.g., ordinary paper sheets, to be fed to image forming unit 4, are attached to the right-hand side portion of housing 2. Receiving tray 12 for receiving copies is attached to the left-hand side portion of housing 2.

Image forming unit 4 includes photosensitive drum 14 located substantially in the center of the inside space of housing 2. Drum 14 is surrounded by main charger 16, erasing unit 18, exposure position 22, which depends on exposure unit 20, developing device 24, transfer unit 26, separating unit 28, cleaning unit 30, de-electrification unit 32, etc., arranged successively in the rotating direction of the drum. Main charger 16 is used uniformly to charge the surface of drum 14. Erasing unit 18 is used selectively to erase electric charge in a desired region on photosensitive drum 14. Exposure unit 20 serves to illuminate the original set on original table 6, and guide reflected light from the original to drum 14 to expose the drum, thereby forming an electrostatic latent image on the drum. Developing device 24 serves to develop the electrostatic latent image, thereby forming a toner image on drum 14. Transfer unit 26 is used to transfer the toner image from drum 14 to the surface of a paper sheet. Separator unit 28 is used to separate the sheet, caused electrostatically to adhere to drum 14 during the transfer operation, from the surface of the drum. Cleaning unit 30 is used to remove those particles of toner which remain on photosensitive drum 14 without having been transferred to the sheet. De-electrification unit 32 is used to remove the surface potential of drum 14 after the cleaning operation. Image forming unit 4 further includes fixing unit 34 for fixing the toner image on the sheet.

Disposed inside the bottom portion of housing 2 is transportation unit 36, which serves to transport the sheets in upper and lower sheet cassettes 8 and 10 to receiving tray 12 via an image transfer region, between photosensitive drum 14 and transfer unit 26, and fixing unit 34.

Transportation unit 36 includes supply mechanism 38, a pair of aligning rollers 40, conveyor belt 42, and a pair of exit rollers 44. Supply mechanism 38 takes the paper sheets out from upper and lower sheet cassettes 810. Aligning rollers 40 align each sheet and deliver it to the transfer region. Conveyor belt 42 transports the sheet, separated from photosensitive drum 14 by means of separating unit 28, to fixing unit 34. Exit rollers 44 serve to discharge the sheet onto receiving tray 12 after the fixing operation.

Exposure unit 20 includes exposure lamp 48, first to sixth mirrors 50, 52, 54, 56, 58 and 60, and lens 62. Lamp 48, which is backed by reflector 46, is used to illuminate the original set on original table 6. The mirrors serve to guide the reflected light from the original onto photosensitive drum 14, the light carrying image information. Lens 62, which is located on an optical path between third and fourth mirrors 54 and 56, is used to project an original image onto drum 14.

Exposure unit 20 further includes first and second carriages 64 and 66 which can reciprocate along the underside of original table 6. First carriage 64 carries thereon reflector 46, exposure lamp 48, and first mirror 50. Second carriage 66, which carries thereon second and third mirrors 52 and 54, is moved in the same direction as first carriage 64, at half the speed thereof. When first and second carriages 64 and 66 move from left to right of FIG. 2, that is, when they move forward, the original is scanned, and the image corresponding to the original is linearly guided onto photosensitive drum 14.

Developing device 24 includes first developing unit 68 for color development and second developing unit 70 for monochrome development. First and second developing units 68 and 70, which include developing rollers 72 and 74, respectively, execute a magnetic-brush development. First and second developing rollers 72 and 74 are alternatively moved toward or away from photosensitive drum 14. Roller 72 or 74 is rotated when it is brought close to drum 14. If developing roller 72 of first developing unit 68 approaches drum 14, monochrome development is effected. If developing roller 74 of second developing unit 70 approaches drum 14, color development, e.g., red development, is effected.

Cleaning unit 30 includes casing 76, cleaning blade 78, auger 80, and a recovery box (not shown). Blade 78, which is housed in casing 76, is adapted to scrape away the toner particles remaining on photosensitive drum 14 when it is brought into contact with the drum surface. Auger 80 discharges the scraped toner from casing 76. The recovery box is used to collect the discharged toner.

Figure 2:
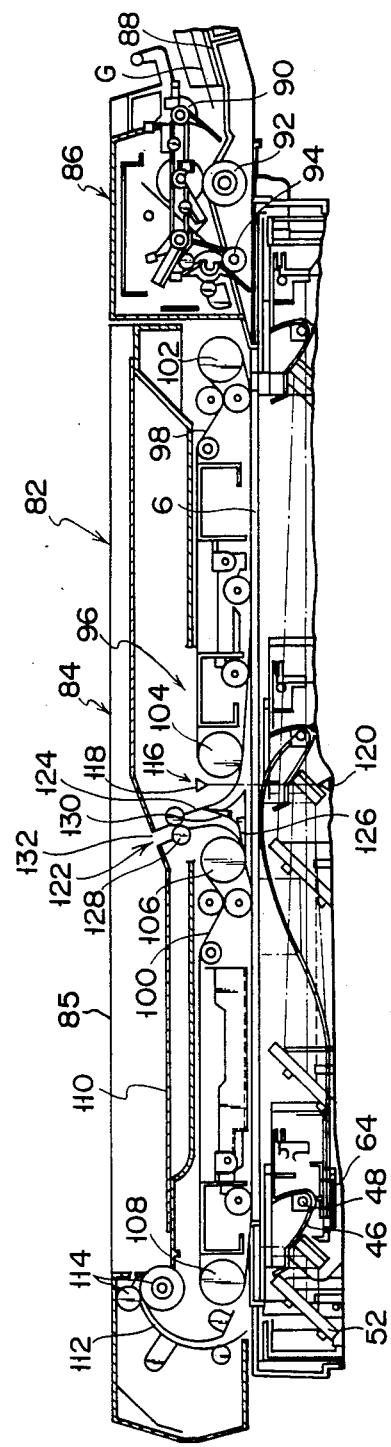
FIG. 2 is a sectional view showing the automatic original feeding apparatus of the image forming apparatus shown in FIG. 1.
Figure 4:
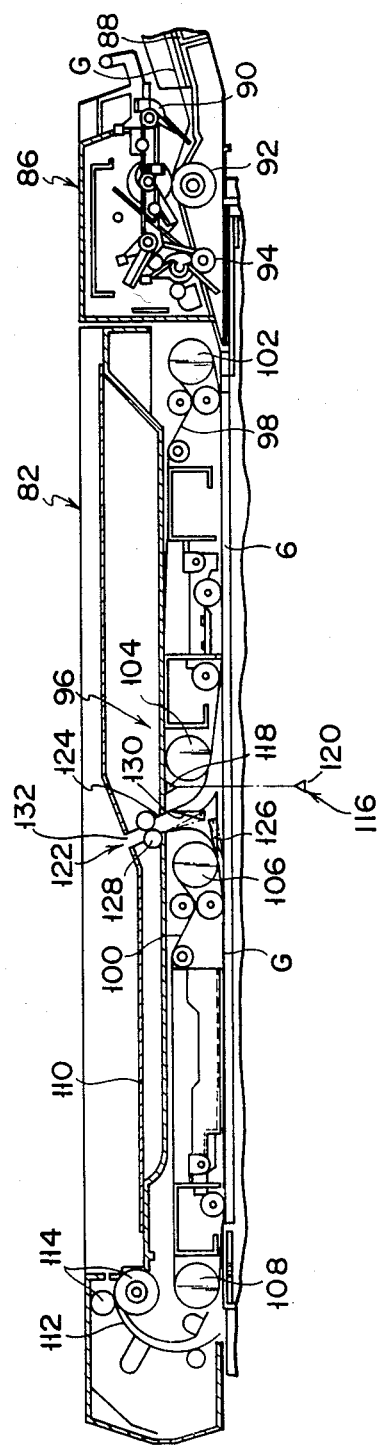
FIGS. 4 to 6 are sectional views for illustrating an original feeding operation of the original feeding apparatus shown in FIG. 2.

Disposed at the top portion of housing 2 is automatic original feeding apparatus 82 for automatically setting the original on original table 6. As shown in FIG. 2, apparatus 82 comprises main unit 84 and original feeding unit 86. Main unit 84 is rockable between a fallen position, where it lies flat on the top of table 6, and an upright position where it leaves the top of table 6 exposed. Feeding unit 86 is located on the right of main unit 84, as in FIG. 2.

Feeding unit 86 includes original holder 88 for holding a pile of originals, pickup roller 90 for delivering the originals one by one, a pair of separating rollers 92 for separating the originals from one another, and a pair of aligning rollers 94 for aligning each separated original.

Main unit 84 includes transportation mechanism 96 for transporting the original from feeding unit 86 onto original table 6 and a case 85 for containing mechanism 96. Mechanism 96 includes a first conveyor belt 98 for transporting the original from feeding unit 86, and a second conveyor belt 100 for transporting the original delivered from belt 98. First belt 98 is passed around and between driving roller 102 and guide roller 104, for reversible rotation. Second belt 100 is passed around and between driving roller 106 and guide roller 108. Turn guide 112 is located on the discharge side of second conveyor belt 100. It guides the original delivered from original table 6 by means of belt 100 toward receiving portion 110, which constitutes part of the top face of main unit 84. Arranged on the discharge side of guide 112 are a pair of exit rollers 114 for discharging the original to portion 110.

Automatic original feeding apparatus 82 further comprises detector 116 for detecting the original transported by means of first and second conveyor belts 98 and 100. Detector 116 includes a pair of sensing elements 118 and 120 arranged on either side of original table 6. Element 118 is disposed between conveyor belts 98 and 100, and element 120 is located under element 118, inside housing 2.

Further, original turning mechanism 122 is disposed between first and second conveyor belts 98 and 100. Mechanism 122 includes turn guide 124, first gate 126, a pair of reversible turn rollers 128, and second gate 130. Guide 124 serves to guide the original upward from between conveyor belts 98 and 100. First gate 126 serves to guide the original reversely transported by belt 100, to turn guide 124 and thus to turn rollers 120. Turn rollers 128 are adapted to transport the original so that the trailing end of the original passes the first gate, and then reverse, thereby feeding the original reversely. Second gate 130 serves to guide the original to first conveyor belt 98. The top face of main unit 84 is provided with entrance 132 for the original guided by turn guide 124.

In FIG. 3, numeral 134 denotes a control circuit for controlling the whole image forming apparatus. A detection signal from detector 116 is supplied to control circuit 134. In response to this detection signal, circuit 134 supplies a driving signal to each of first to fourth driver circuits 136, 138, 140 and 142. In response to this driving signal, driver circuits 136, 138, 140 and 142 drive first driving roller 102, second driving roller 106, first gate 126, and second gate 130, respectively.

Figure 6:
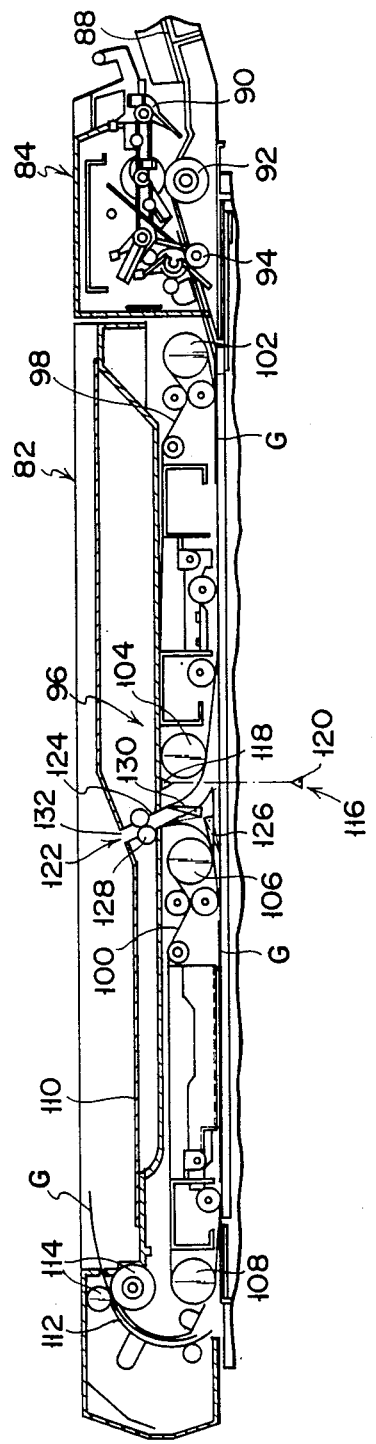

In copying one side of original G, the original is set on original holder 88, and a copy button at a control section (not shown) is operated. Thereupon, original G is first taken out by means of pickup roller 90. Original G is separated from its successors by means of separating rollers 92, and delivered to aligning rollers 94. After it is aligned by means of rollers 94, the original is fed into main unit 84. In the main unit, original G is transported toward second conveyor belt 100 by first conveyor belt 98. When the original transported by first belt 98 is detected by detector 116, second belt 100 is driven for a predetermined period of time, and then stops. Thus, original G is transported to a predetermined position on original table 6, as shown in FIG. 6.

The moment original G is set, photosensitive drum 14 starts to rotate, and main charger 16 is actuated. As a result, drum 14 is uniformly charged. Then, exposure lamp 48 of exposure unit 20 is lit. In this state, first carriage 64, carrying lamp 48 and first mirror 50, and second carriage 66, carrying second and third mirrors 52 and 54, are moved from left to right of FIG. 1, along the under surface of original table 6. Thus, original G on table 6 is linearly scanned and exposed. Light reflected by original G is guided onto photosensitive drum 14. As a result, an electrostatic latent image corresponding to an image of the original is formed on the surface of drum 14. This latent image is developed by means of first or second developing unit 68 or 70. Thus, a toner image is formed on drum 14.

In synchronism with the toner image forming operation, a paper sheet is automatically taken out from upper or lower cassette 8 or 10 by supply mechanism 38. The sheet is aligned by means of aligning rollers 40, and then fed into the transfer region. In the transfer region, the toner image on photosensitive drum 14 is transferred to the sheet by the agency of transfer unit 26. At this time, the sheet is caused to adhere to the surface of drum 14 by means of electrostatic force. Thereafter, the sheet is separated from drum 14 by means of separating unit 28, and is then fed into fixing unit 34 by means of conveyor belt 42. Unit 34 melts and fixes the toner image onto the sheet. Then, the sheet is discharged onto receiving tray 12 by means of exit rollers 44.

Figure 5:
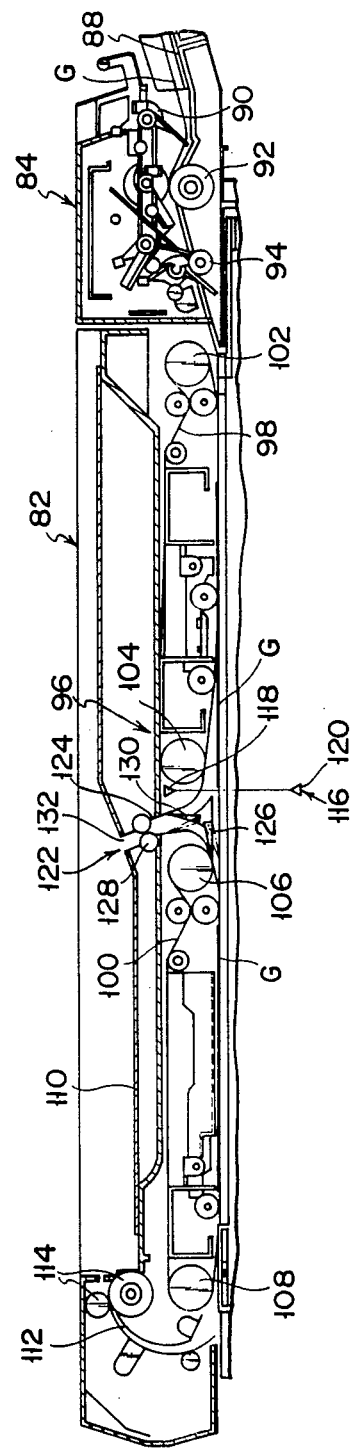

During this copying operation, feeding unit 86 is operated, whereby second original G is taken out. Then, only first conveyor belt 98 is driven, so that the second original is transported onto original table 6, as shown in FIG. 5. When second original G is detected by detector 116, belt 98 is stopped. Thus, the second original is held in a predetermined stand-by position. When copying of first original G is finished, both first and second conveyor belts 98 and 100 are driven. As a result, the first original is discharged to receiving portion 110 via turn guide 112 and exit rollers 114, as shown in FIG. 6, while the second original is delivered to a copying position. Then, the second original is copied.

Thereafter, originals G are successively fed to and set on original table 6 for copying.

Figure 7:
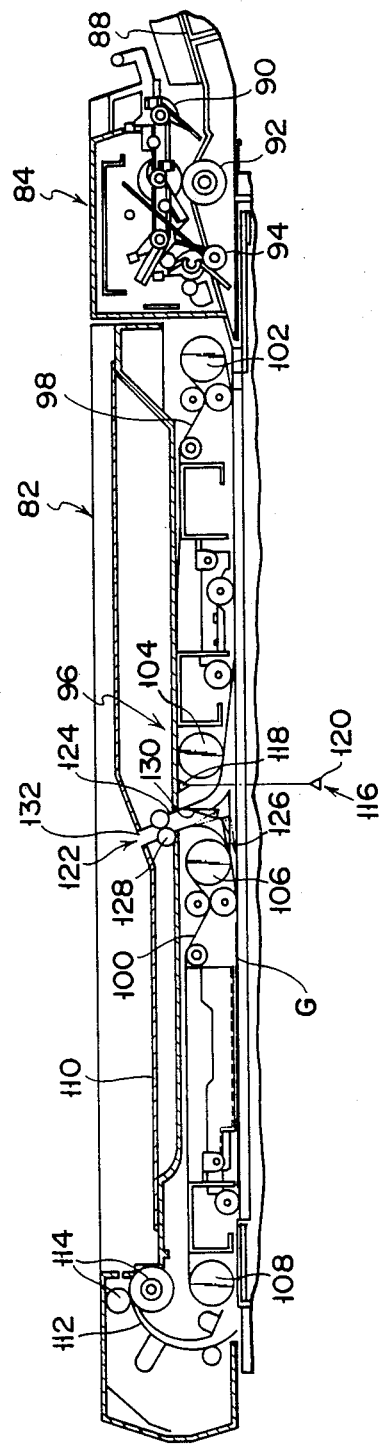
FIGS. 7 to 12 are sectional views for illustrating an original turning operation of the original feeding apparatus shown in FIG. 2.
Figure 8:
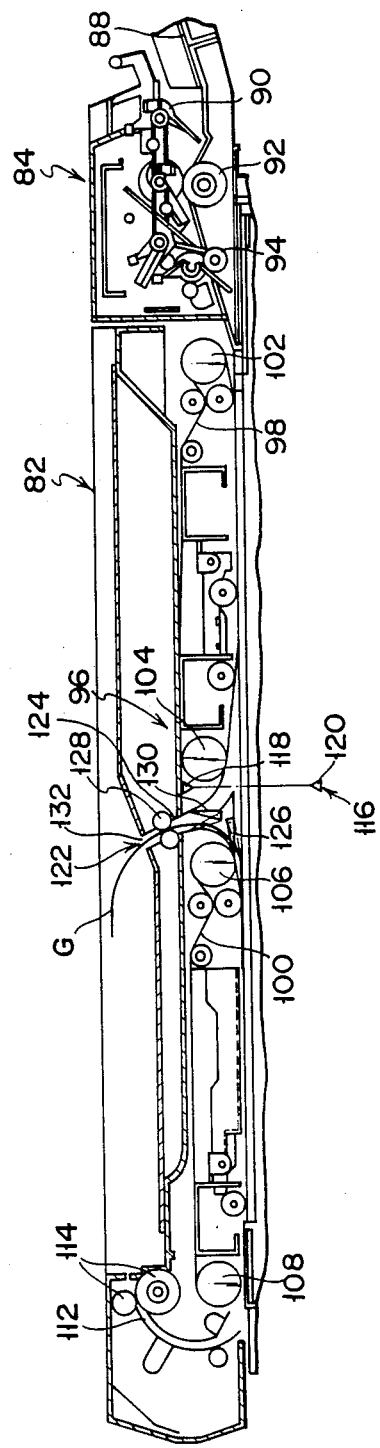
Figure 9:
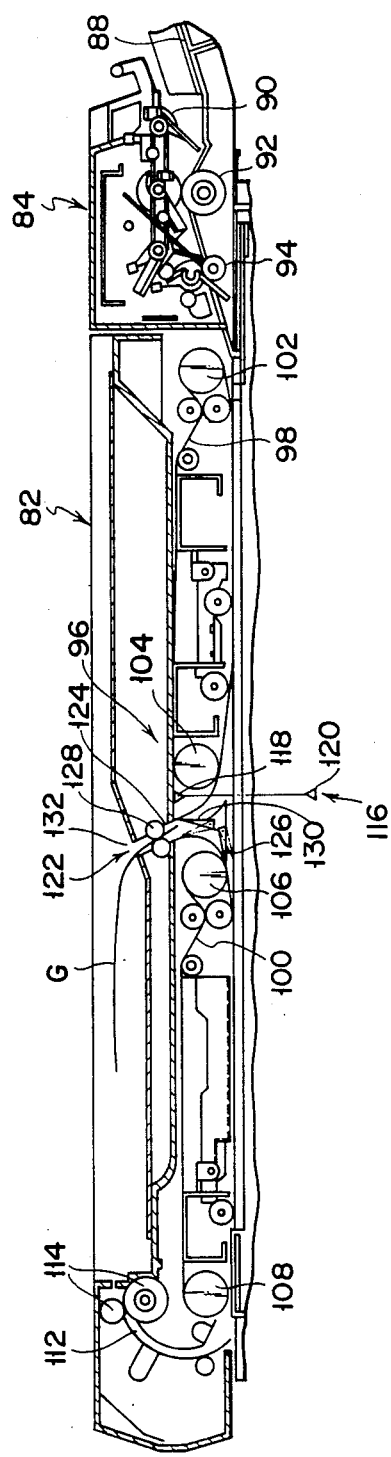
Figure 10:
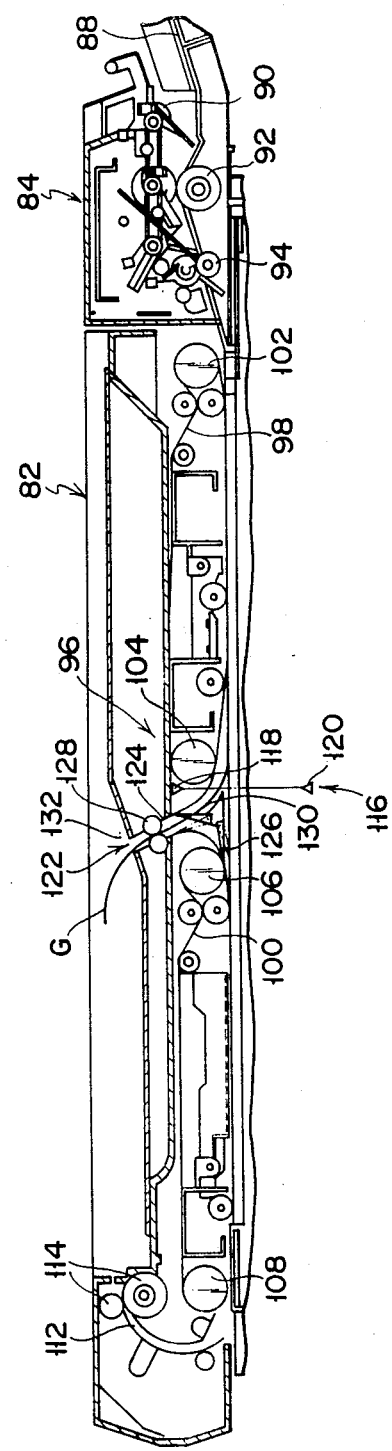
Figure 11:
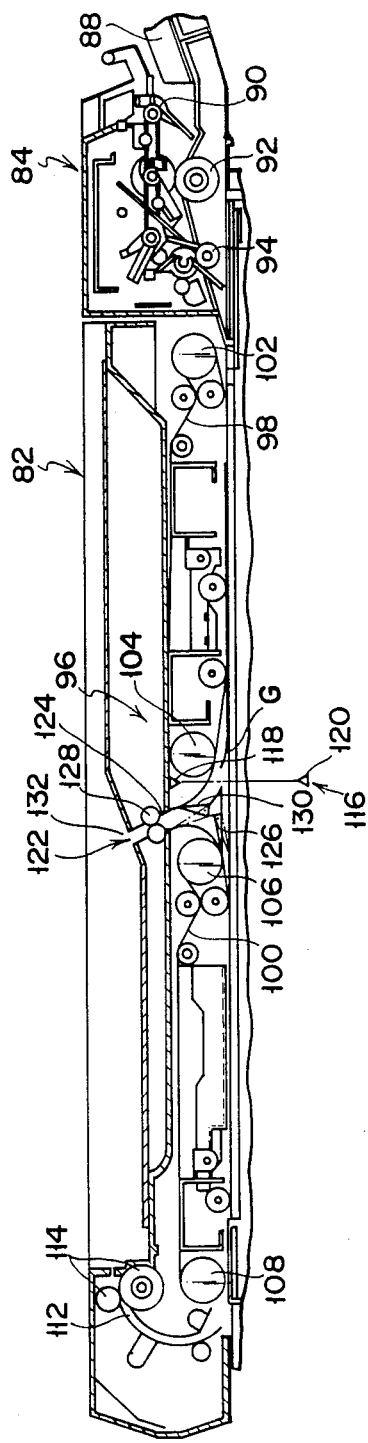
Figure 12:
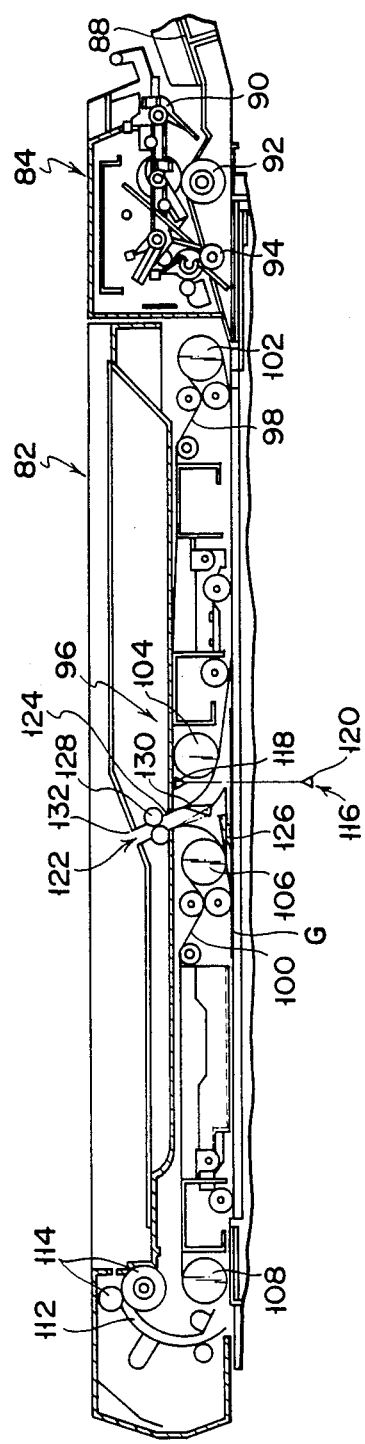

In copying both sides of original G, first and second gates 126 and 130 are located in the positions indicated by imaginary and solid lines in FIG. 7, respectively, after one side of original G is copied in the aforementioned manner. Then, second conveyor belt 100 is rotated reversely. Thereupon, original G is delivered to turn rollers 128 through first and second gates 126 and 130, as shown in FIG. 8. As rollers 128 rotate, the original is transported upward through entrance 132. When original G is transported for a predetermined distance, as shown in FIG. 9, turn rollers 128 are reversed, and first and second gates 126 and 130 are shifted to the positions indicated by solid and imaginary lines, respectively. Thereupon, original G is delivered to the side of first conveyor belt 98 to be transported thereby, in a manner such that it is turned inside out, as shown in FIG. 10. When the original is transported for a predetermined distance, as shown in FIG. 11, belt 98 is rotated forward. Thus, original G is delivered to second conveyor belt 100, as shown in FIG. 12, so that it is set inside out in the copying position.

When original G is set inside out on original table 6 in this manner, the same copying operation as aforesaid is performed again. Thus, an image on the other side of original G is transferred onto the sheet. Thereafter, original G is turned over in the aforesaid manner to be copied.

As described above, the second original is fed onto original table 6 to be set on stand-by during the copying operation for the first original. Therefore, it is possible to shorten the necessary transportation distance for subsequent original G to be set in the copying position after the copying operation for preceding original G is finished. Thus, the original transportation time can be shortened, so that this arrangement can be applied to high-speed machines.

Further, first and second originals G can be automatically set on original table 6, that is, two originals can be set on table 6 at a time. If the copying machine has a successive page copying function, therefore, this function can be duly utilized.

Since turning mechanism 122 is disposed between first and second conveyor belts 98 and 100, moreover, original G can be turned over after it is transported for a distance substantially half the overall length of transportation mechanism 96. Thus, the original transportation time can be made short enough for application to high-speed machines.

Since there is no need of any installation space for turning mechanism 122, furthermore, the apparatus can be reduced in size.

What is claimed is:

1. A sheet feeding apparatus for feeding each of a plurality of sheets one by one to a predetermined position and discharging the sheet therefrom, comprising:

first and second reversible transporting means, which are essentially co-linear with one another and which are arranged in tandem, for selectively transporting the sheet along them in opposite directions, to feed the sheet to the predetermined position and discharge it therefrom; and turning means, disposed between the first and second transporting means, for receiving the sheet discharged from the second transporting means toward the first transport means, and then feeding the received sheet to the first transporting means in such a manner than an end of the sheet that is the trailing end when it is received therein becomes the leading end when the sheet is discharged therefrom to the first transporting means, whereby the sheet being discharged from the turning means to the first transporting means is turned over.

2. The sheet feeding apparatus according to claim 1, wherein each of said first and second transporting means each includes a reversible belt conveyor.

3. The sheet feeding apparatus according to claim 1, wherein said turning means includes:

a turn guide having entrance and exit openings, the entrance opening opening toward an end of said second transporting means located near to said first transporting means, the exit opening opening toward an end of said first transporting means located proximate said second transporting means, and the entrance opening and second transporting means, and the entrance opening and the exit opening being combined with each other at their inner ends to provide a one pass way;

a first gate provided at the entrance opening so as to be movable between a closed position and an open position, wherein, in the closed position, the first gate allows the transportation of the sheet from said first transporting means to said second transporting means, and in the open position the first gate inhibits the transportation of the sheet from said second transporting means to said first transporting means but allows the sheet discharge from said second transporting means toward said first transporting means to enter into the entrance opening of said turning means;

a second gate provided at a junction of the entrance opening and the exit opening so as to be movable between a closed position and an open position, wherein, in the closed position, the second gate allows the sheet entering into the entrance opening of said turning means from said second transporting means to be guided into the one pass way but inhibits the sheet entering into the entrance opening from said second transporting means not to be guided into the exit opening, and in the open position the second gate allows the sheet guided into the one pass way to be moved into the exit opening toward the second-transporting-means-side end of said first transporting means but inhibits the sheet guided into the one pass way to be moved into the entrance opening toward the first-transporting-means-side end of said second transporting means;

means, provided at the one pass way, for reversibly driving the sheet; and means for controlling the first gate, the second gate, and the reversible sheet driving means in such a manner that, when the sheet is transported from said second transporting means toward said first transporting means, the first gate is located at its open position, the second gate is located at its closed position, and the reversible sheet driving means is operated to drive the sheet entering into the entrance opening of said turning means from said second transporting means to be forcibly guided into the one pass way, and after entering the sheet into the one pass way, the second gate is located at its open position, and the reversible sheet driving means is operated to drive the sheet to be forcibly discharged from the one pass way toward the second-transporting-means-side end of said first transporting means, and when the sheet is transported from said first transporting means toward said second transporting means, the first gate is located at its closed position so that the first gage allows the transportation of the sheet from said first transporting means toward said second transporting means.

4. The sheet feeding apparatus according to claim 1, wherein said first and second transporting means and said turning means are set in a common case.

5. The sheet feeding apparatus according to claim 4, wherein the sheet feeding apparatus is used in an electrophotographic machine having an original table at a predetermined position on which an original is placed so as to be illuminated by light and copied, and said case is used as an original cover in the electrophotographic machine, the original cover covering the original table, so that said first and second transporting means set in the original cover are located along the original table.

6. The sheet feeding apparatus according to claim 1, wherein said turning means comprises a pair of reversible turn rollers located between said first and second transporting means, a first gage adapted to guide the sheet from said second transporting means to said turn rollers, and a second gate adapted to guide the sheet from said turn rollers to said first transporting means.

7. A method of feeding a sheet to a predetermined position and of discharging the sheet therefrom, comprising:

driving first and second tandem, essentially co-linear transporting means in a first direction to transport the sheet to said predetermined position; then driving said second transporting means in a second direction to transport said sheet towards said first transporting means;

guiding the sheet into a turning means located between said first and second transporting means;

turning said sheet over so that an end of the sheet that was the trailing end when the sheet entered the turning means becomes the leading end when the sheet exits the turning means;

guiding the inverted sheet from said turning means to said first transporting means while driving said first transporting means in said second direction to thereafter transport the sheet away from said second transporting means; and driving said first and second transporting means in said first direction to transport said sheet to said predetermined position.

8. The method of claim 7, wherein the step of turning comprises the step of transporting the sheet into and out of reversible rollers of said turning means.

9. The method of claim 8, wherein the steps of guiding the sheet to and from said turning means comprise the steps of selectively operating first and second gates to selectively guide the sheet into and out of said reversible rollers.

* * * * *